(12) United States Patent
Hjalmarsson et al.

(10) Patent No.: US 10,895,156 B2
(45) Date of Patent: Jan. 19, 2021

(54) TURBOMACHINE ARRANGEMENT WITH A PLATFORM COOLING DEVICE FOR A BLADE OF A TURBOMACHINE

(71) Applicant: Siemens Aktiengesellschaft, Munich (DE)

(72) Inventors: Christer Hjalmarsson, Finspong (SE); Martina Johansson, Norrkoping (SE); Janos Szijarto, Finspong (SE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 116 days.

(21) Appl. No.: 16/322,963

(22) PCT Filed: Jul. 14, 2017

(86) PCT No.: PCT/EP2017/067909
§ 371 (c)(1),
(2) Date: Feb. 3, 2019

(87) PCT Pub. No.: WO2018/036719
PCT Pub. Date: Mar. 1, 2018

(65) Prior Publication Data
US 2019/0186268 A1 Jun. 20, 2019

(30) Foreign Application Priority Data
Aug. 25, 2016 (EP) .................... 16185678

(51) Int. Cl.
*F01D 5/08* (2006.01)
*F02C 7/18* (2006.01)

(52) U.S. Cl.
CPC .............. *F01D 5/08* (2013.01); *F01D 5/081* (2013.01); *F02C 7/18* (2013.01); *F05D 2240/81* (2013.01); *F05D 2260/201* (2013.01)

(58) Field of Classification Search
CPC ... F01D 5/08; F01D 5/081; F02C 7/18; F05D 2240/81; F05D 2260/201; Y02T 50/60
(Continued)

(56) References Cited

U.S. PATENT DOCUMENTS 4,712,979 A * 12/1987 Finger .................... F01D 5/081
416/96 R
6,120,249 A * 9/2000 Hultgren ................. F01D 5/187
416/97 R
(Continued)

FOREIGN PATENT DOCUMENTS

CH 703873 A2 * 3/2012 ............ F01D 5/186
CH 703875 A2 3/2012
(Continued)

OTHER PUBLICATIONS

PCT International Search Report and Written Opinion of International Searching Authority dated Aug. 18, 2017 corresponding to PCT International Application No. PCT/EP2017/067909 filed Jul. 14, 2017.
(Continued)

*Primary Examiner* — J. Todd Newton

(57) ABSTRACT

A turbomachine arrangement having a platform cooling device for a blade positioned at a platform of the blade. The cooling device's peripheral edge is in contact with the platform; a first surface portion forms a first cavity between the cooling device and platform and has impingement holes to impinge onto the platform; a second surface portion forms a second cavity between the cooling device and platform; a barrier in contact with the platform forms a connection between two sections of the edge and fluidically separates the first and second cavity. The cooling device is connected at the edge to the blade so the first and second cavity are formed between the cooling device and blade. The blade has a supply passage, connecting a hollow core and the second (Continued)

cavity for supplying cooling fluid to the second cavity and the first cavity is supplied with cooling fluid via the impingement holes.

13 Claims, 5 Drawing Sheets

(58) Field of Classification Search
USPC ...................................................... 416/193 A
See application file for complete search history.

(56) References Cited

U.S. PATENT DOCUMENTS

| | | | | |
|---|---|---|---|---|
| 7,121,803 | B2 * | 10/2006 | Gautreau | F01D 5/26 |
| | | | | 416/193 A |
| 10,030,523 | B2 * | 7/2018 | Quach | F01D 25/12 |
| 10,215,051 | B2 * | 2/2019 | Thomen | F04D 29/542 |
| 2004/0001753 | A1 * | 1/2004 | Tiemann | F01D 5/187 |
| | | | | 416/97 R |
| 2004/0165983 | A1 * | 8/2004 | Elliott | F01D 25/12 |
| | | | | 415/110 |
| 2012/0082548 | A1 | 4/2012 | Ellis et al. | |
| 2012/0082549 | A1 * | 4/2012 | Ellis | F01D 5/187 |
| | | | | 416/95 |
| 2012/0082565 | A1 * | 4/2012 | Ellis | F01D 5/186 |
| | | | | 416/97 R |
| 2012/0328451 | A1 * | 12/2012 | Lomas | F01D 5/187 |
| | | | | 416/97 R |
| 2018/0355726 | A1 * | 12/2018 | Perry, II | F01D 5/085 |

FOREIGN PATENT DOCUMENTS

| | | | | | |
|---|---|---|---|---|---|
| CN | 1162345 | A | * | 10/1997 | |
| CN | 102454428 | A | * | 5/2012 | ............... F01D 5/18 |
| CN | 103184895 | A | * | 7/2013 | ............. F01D 5/188 |
| EP | 2110515 | A2 | | 10/2009 | |
| EP | 2728114 | A1 | * | 5/2014 | ............. F01D 5/187 |
| EP | 2728114 | A1 | | 5/2014 | |
| EP | 2787170 | A1 | | 10/2014 | |
| EP | 3287596 | A1 | * | 2/2018 | ................ F02C 7/18 |
| FR | 2488327 | A1 | * | 2/1982 | ............. F01D 5/185 |

OTHER PUBLICATIONS

EP search report dated Jan. 30, 2017 for corresponding EP patent application No. 16185678.6.

* cited by examiner

TURBOMACHINE ARRANGEMENT WITH A PLATFORM COOLING DEVICE FOR A BLADE OF A TURBOMACHINE

CROSS REFERENCE TO RELATED APPLICATIONS

This application is the US National Stage of International Application No. PCT/EP2017/067909 filed Jul. 14, 2017, and claims the benefit thereof. The International Application claims the benefit of European Application No. EP16185678 filed Aug. 25, 2016. All of the applications are incorporated by reference herein in their entirety.

FIELD OF INVENTION

The present invention particularly relates to a turbomachine arrangement with a platform cooling device that can be connected to a blade of a turbomachine, particularly a gas turbine engine.

BACKGROUND OF INVENTION

In modern day turbo machines various components of a turbomachine operate at very high temperatures. This is specifically true for components in a turbine section of a gas turbine engine. These components include blades and vanes within the turbine section. These blades and vanes typically are shaped in form of an airfoil and have further elements connected to it like platforms as boundary for the working fluid path. A blade may also have a root portion which is used to fix the blade to a turbine disc. High temperatures during operation of the turbomachine may damage the blade, hence cooling of the blade component is important. Cooling of all these components is generally achieved by passing a cooling fluid through the component or along the component. As cooling fluid typically air from a compressor of the turbomachine is used.

Besides it should be noted that turbine blades are typically cast components whereby the casting procedure allows to generate a hollow core within the blade, which then can be used to guide cooling fluid through the interior.

Such a blade typically includes an aerofoil portion, a root portion and a blade platform, the platform separating the aerofoil from the root portion. Additionally, some blades may comprise also a shroud at the tip of the aerofoil portion. Furthermore, a root portion may sometimes be followed by a neck portion before the platform begins. The neck may extend the root without having specific features for connecting to the disc. The airfoil portion of the blade is typically cooled by a cooling fluid through passages formed in the airfoil portion of the blades. Furthermore, film cooling may be used to cool the aerofoil and the platform portion by having various small holes allowing to pass air in a way that the air builds a film or cushion between the hot working fluid and the cooled surface. Eventually, the cooling fluid will mix with the hot working fluid within the main working fluid passage of the turbine section.

An aerofoil is defined by a leading edge directed to where the hot working fluid will come from during operation, and a trailing edge directed in the direction of the fluid flow of the working media. Furthermore, an aerofoil is defined by a suction and a pressure surface, depending on the curvature and the direction of rotation of the blade.

Platforms may also be defined by a region close to the leading edge and a region close to the trailing edge, and furthermore, may be split in a region at the suction side of the aerofoil and a region at the pressure side of the aerofoil. At the platforms different temperatures arise depending on the location around the aerofoil. At different locations of the platform different amount of cooling is needed at the platform surface. Cooling of the blade platform may be difficult since most of the cooling air is provided to the inner core of the blade to cool the aerofoil. Nevertheless, surfaces exposed to the hot working fluid provided from the combustors may need specific cooling. Normally, cooling of blade platforms is achieved by providing film cooling by a flow of a portion of the cooling air over the upper surfaces of the blade platforms, however, manufacturing of film cooling holes may be time consuming and therefore costly.

Additionally, a root section or a neck section of a blade needs adequate cooling as otherwise possibly oxidation and cracking of the underside of the platforms or the root may occur.

Patent application EP 2 110 515 A2 shows a damper between two rotor blades which supports sealing and cooling of blade platforms. Patent application EP 2 728 114 A1 focuses on the cooling of the platform of a blade of a turbomachine by using a platform cooling device that can be connected to an underneath side of a blade platform. Patent application CH 703875 A2 shows an alternative design with an impingement plate which may be located preferably at the pressure side platform. All three documents focus on impingement cooling.

SUMMARY OF INVENTION

In some engines, a pressure side platform of cooled turbine blades may experience overheating. Therefore, it is an object of the present invention to provide a platform cooling device for a blade of a turbomachine to provide efficient cooling.

This object is achieved by providing a turbomachine arrangement with a platform cooling device for a blade of a turbomachine. Furthermore, the invention is related to a turbomachine subsection comprising such a platform cooling device. Embodiments of the invention will also be described in the dependent claims.

According to the invention, a turbomachine arrangement is provided comprising a blade of a turbomachine and a platform cooling device for the blade configured to be positioned at a platform of the blade. The platform cooling device comprises a peripheral edge configured to be in contact with the platform. This peripheral edge can also be identified as circumferential edge, circumferential about and relative to the platform cooling device. It further comprises a first surface portion configured to form a first cavity between the platform cooling device and the platform, the first surface portion comprising a plurality of impingement holes configured to impinge onto the platform during operation of the turbomachine. Besides, it comprises also a second surface portion configured to form a second cavity between the platform cooling device and the platform and a barrier, the barrier being configured to be in contact with the platform, the barrier forming a connection between two sections of the edge and separating the first cavity from the second cavity fluidically. In other words, the barrier is a separating wall, wherein the wall is connecting two sections of the edge. According to the invention the platform cooling device and the blade are separately manufactured components, and the platform cooling device is connected at the edge to the blade, such that the first cavity and the second cavity are formed between the platform cooling device and the blade. Additionally, the blade comprises a cooling fluid supply passage, connecting a hollow blade core and the second cavity, for supplying of cooling fluid to the second cavity during operation. The first cavity is supplied, during operation, with cooling fluid via the impingement holes of the first surface portion.

The platform cooling device is configured to be positioned at a platform of the blade. The turbine arrangement defines the arrangement of a blade with a connected platform cooling device.

The platform cooling device could also be specified as a platform cooling screen.

The platform cooling device is advantageously not part of the working fluid path but is positioned underneath the platform of the blade. "Underneath" means in this respect the back or rear side of the platform, i.e. a surface not washed by the working fluid.

Even though the blade is defined according to the invention to have just a platform and no further components are specified it is clear that the blade comprises all its typical components like an aerofoil, like the platform, like a root and optionally also an neck and optionally also a shroud.

The peripheral or circumferential edge is an elevated surface region. It is considered to be a rim with a flat top. The flat top of the rim follows particularly the form of the opposite platform surface to which it is going to be connected.

The contact between the circumferential edge and the platform is advantageously a continuous connection between the two components. That means that the circumferential edge is also a fluidic barrier for cooling fluid.

According to the invention two distinct and separate cavities are formed which can be equipped with different cooling features. By this, specific adaptations to the cooling needs of the platform are possible by specific configuration of the platform cooling device. The first surface portion with the impingement holes is advantageously close to a trailing edge of the platform and/or close to a midsection of the platform. The second surface portion may be close to a leading edge of the to be cooled platform.

By using this invention particularly for a pressure platform section of the blade, the platform can be cooled in a highly controlled way which allows the blade to operate in higher temperatures without risking thermal damages to the blade.

Additionally, the amount of cooling fluid can be optimized so that the overall efficiency of the turbomachine is improved.

According to the invention, a plurality of impingement holes is located at the first surface portion. According to a first embodiment the second surface portion may be completely free of impingement holes. This allows to configure the cooling fluid in a way that only in one region impingement cooling is performed. Alternatively, the second surface portion may also comprise impingement holes but advantageously in a different number and in a different configuration compared to the first surface portion. In particular, the pattern of impingement holes at the second surface portion may be different that the pattern of impingement holes at the first surface portion. Furthermore or additionally, the cooling hole diameters of the impingement holes of the different regions may be different to another.

According to an embodiment, a first segment of the edge may be configured to connect with the root or neck section of the blade. Furthermore, a second segment of the blade may be configured to connect with a rear or back surface of the platform of the blade. In consequence, the first surface portion and the second surface portion may be curved. By this configuration the platform cooling device is able to cover the cavity formed underneath the platform of the blade.

As mentioned before, the platform cooling device and the blade are separately manufactured components. These separately manufactured components are connected or attached to another to form the turbomachine arrangement, particularly fastened or brazed to another. The connection is performed by connecting the edge of the platform cooling device to the blade. Therefore, the previously mentioned first and second cavities are formed between the platform cooling device and the blade. Preferably, these two mentioned components are securely or fixedly attached to another. In one embodiment the two components may be loose in some respect but due to centrifugal forces during operation the platform cooling device will be held in place underneath the blade platform.

To form the first cavity the first surface is distant to the rear surface of the platform. Additionally, to form the second cavity the second surface is also distant to a rear surface of the platform. By this a space is provided between these two opposing surfaces so that cooling fluid or cooling air can be guided between these surfaces.

In a further embodiment the platform cooling device is built from a different material than the blade. In an embodiment the platform cooling device is made of nickel alloy. Nickel alloys can be easily brazed, have high strengths, can withstand high temperatures and are corrosion resistant.

Alternatively the blade and the platform cooling device may be built from the same material.

In one embodiment the platform cooling device may be formed through laser sintering or laser melting or other types of additive manufacturing. These additive manufacturing techniques are an efficient way of forming a desired three-dimensional shape with channels to ensure the cooling effectiveness.

According to the invention, the blade comprises the cooling fluid supply passage, particularly connecting a hollow blade core and the second cavity, for supplying of cooling fluid to the second cavity.

The first cavity is supplied, during operation, with cooling fluid via the impingement holes of the first surface portion. This impingement fluid may be fed from the upper disc cavity in front of the blade and then passes the impingement holes in the first surface section. The upper disc cavity may be a cavity in front of a rotor disc to which the rotor blade is attached to, and is formed below a seal structure so that air or a cooling fluid is provided and guided through the upper disc cavity.

Optionally, the first cavity may additionally be also supplied via a cooling fluid supply passage from the hollow blade core.

According to a further embodiment the platform may also comprise at least one first passage through the platform for releasing cooling fluid from the first cavity. The at least one first passage may be configured as film cooling holes at a trailing edge region of the platform. Additionally or alternatively, the platform may also comprise at least one second passage through the platform for releasing cooling fluid from the second cavity. The at least one second passage may also be configured as film cooling holes, this time at the leading edge region of the platform. The film cooling holes for the first cavity may be angled in direction of the fluid flow of the main working fluid. The film cooling holes from the second cavity may be angled in opposite direction of the flow of the working media in the main fluid path.

As already indicated, the blade may be hollow and may have the hollow core. The hollow core may be used to cool the blade from the inside. The supply of cooling air to the hollow core may be provided from passages of the hollow core which may also be located within the neck or root region of the blade. Thus, the aerofoil may comprise a cooling system incorporated within the blade. As said before, the second cavity may be supplied with a cooling fluid from the hollow core or supply channel to the hollow core of the blade. In other words, the blade core may also comprise at least one aerofoil supply passage through the interior of the blade for supplying the airfoil cooling system with cooling fluid. A part of this cooling fluid may be branched off, as stated before, to supply the second cavity. Furthermore, there may also be a passage between one of the cavities to the hollow core for releasing cooling fluid from one of the cavities. For instance, a cooling fluid release passage may be present for a leasing of cooling fluid from the first cavity into the aerofoil supply passage, to be furthermore released into the aerofoil cooling system. All of the mentioned passages may need to be configured such that the amount of fluid is perfectly configured so that the underneath platform of the blade is properly and sufficiently cooled.

According to an embodiment, the platform cooling device advantageously may be connected to the blade at a pressure side at the blade. This allows a configuration so that the hottest region of the platform is efficiently and effectively cooled. Portions that require an increased cooling can then be provided by additional cooling fluid and more distributed cooling fluid by using the first cavity and its related features.

According to a further embodiment the first cavity may be positioned adjacent to a central section and/or a trailing edge section of the platform. The terminology central and trailing is meant in respect of a fluid flow of the working medium during operation passing along the blade. Additionally, the second cavity may be positioned adjacent to a leading edge section of the blade. Again, the terminology leading edge is meant in respect of a fluid flow of a working medium during operation.

Coming back to the connecting method of the platform cooling device and the blade, it was mentioned that brazing is the a way of connecting these two components. Brazing has the advantage that it does not melt the base metal of the joint and allows tighter control over tolerances, hence, producing a clean joint. Furthermore, brazing allows the similar metals to be joint. Additionally, brazing produces less thermal distortion due to uniform heating of the brazed pieces.

Alternative connection methods can be used, for example welding, laser welding or bonding, resulting in a fixed connection between the platform cooling device and the blade. Alternatively the platform cooling device may be fastened to the blade such that it is held in place due to centrifugal forces during operation, i.e. revolving of the connected arrangement of blade and platform cooling device.

Besides the foregoing, the invention is also directed to a turbomachine sub-section which comprises a plurality of blades connected to a rotary disc, following an upstream annular stator section. The plurality of blades each are connected to the rotary disc and each of the blades are supplied with a platform cooling device as explained before. The upstream annular stator section may be particularly a plurality of vanes, upstream of the entity of rotary disc its connected blades. A disc cavity is present in front of the rotary disc through which cooling fluid is provided. The disc cavity is formed between the rotary disc and the stator section and underneath leading is of the plurality of the platforms of the bladed, particularly underneath a sealing structure below the plurality of the platforms. During operation cooling fluid is supplied via the disc cavity and continued to be provided to the impingement holes of the first surface portion so that the first cavity is supplied with the cooling fluid. It needs to be pointed out that the disc cavity is not part of the main fluid path but is a component of a secondary fluid path system. Considering that the disc is mounted around an axis of rotation the disc cavity is formed in radial inwards direction of the platforms of the blade in direction of the rotary axis of the rotor.

It has to be understood that the overall cooling system is based on pressure differences within the different passages and cavities which allows the flow of cooling fluid or cooling air through the passages and the overall system for cooling fluid. The pressure of cooling air may be provided from the compressor from which some of the cooling air is branched off.

The overall invention has the advantage that the two separate components—the blade and the platform cooling device—are easier to manufacture separately than as a single component. To assemble these two separate components is fairly simple as only a connection is only provided via the circumferential edge of the platform cooling device.

Furthermore, specific regions of the blade can be treated with cooling fluid in a very precise way. Particularly, the cooling may be different in a leading edge region and a trailing edge region of the platform. Furthermore, also a suction side platform section can be treated differently than a pressure side platform section.

BRIEF DESCRIPTION OF THE DRAWINGS

The above-mentioned and other features of the invention will now be addressed with reference to the accompanying drawings of the present invention. The illustrated embodiments are intended to illustrate but not to limit the invention. The drawings contain the following features, in which similar numbers refer to similar parts throughout the description and the drawings.

DETAILED DESCRIPTION OF INVENTION

Embodiments of the present invention described below relate to a blade component in a turbomachine, particularly a gas turbine engine. However, the details of the embodiment described in the following can be transferred to a vane component without modifications, so that the explanation for blades would also be valid for a vane structure. The turbomachine is in particular a gas turbine engine but the invention could also be used for a steam turbine, a compressor or other rotary equipment, or even non-rotary equipment with a similar structure like the explained blade.

Figure 1:
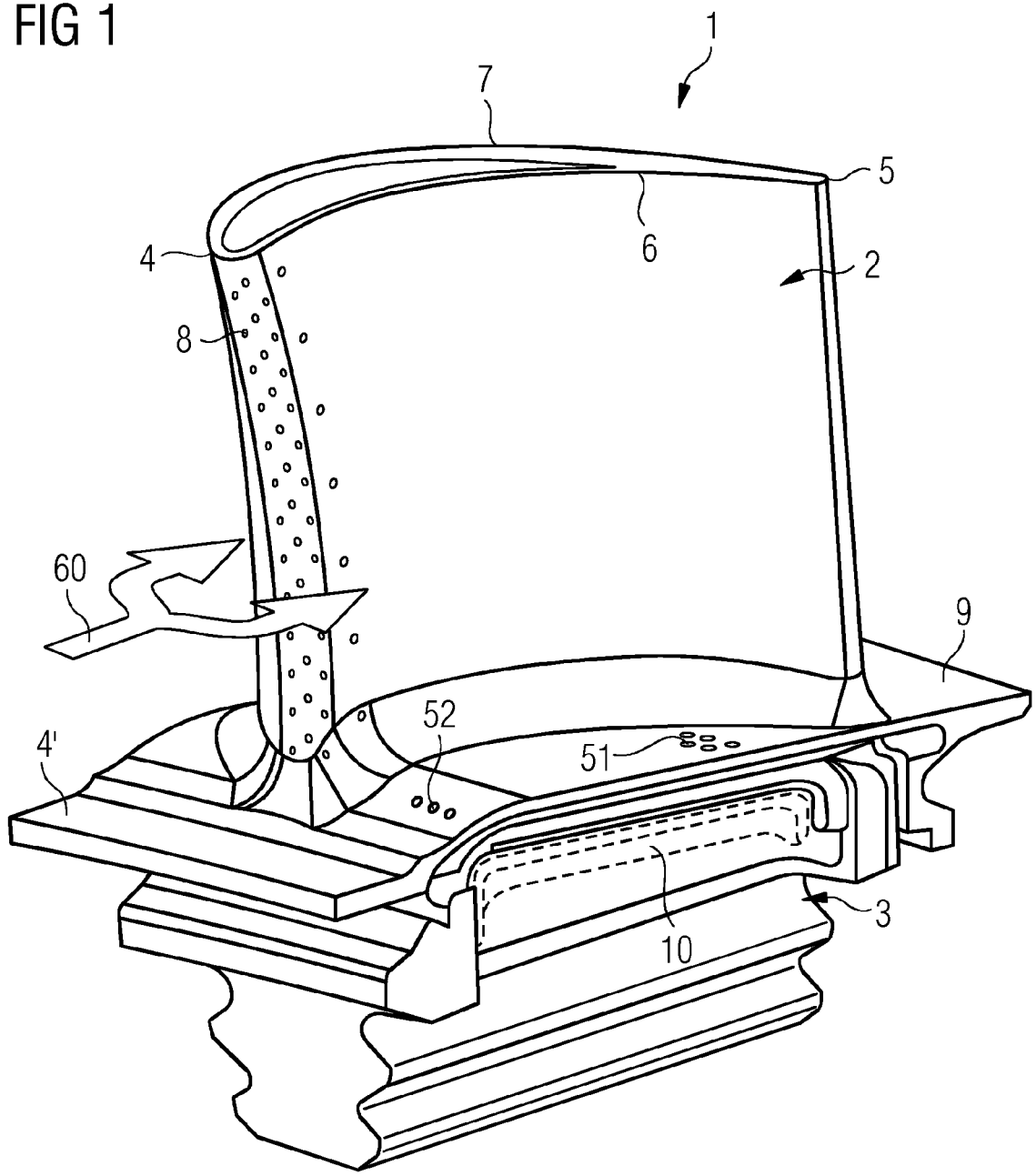
FIG. 1 shows a schematic three-dimensional picture of a blade equipped with a platform cooling device according to the invention.

FIG. 1 is a schematic diagram of an exemplary blade 1 of a rotor of a turbomachine, such as a gas turbine engine. The blade 1 includes an aerofoil portion 2 and the root portion 3. The aerofoil portion 2 projects from the root portion 3 in a radial direction as depicted, wherein the radial direction means a direction perpendicular to the rotation axis of the rotor.

The blade 1 is attached to a rotor disc (not shown) of the rotor in such a way that the root portion 3 of the blade 1 is connected to the rotor disc, whereas the aerofoil portion 2 is located at a radial outermost position. The aerofoil portion 2 has an outer surface including a pressure side 6, also called pressure surface, and a suction side 7, also called suction surface. The pressure side 6 and the suction side 7 are joined together along an upstream leading edge 4 and a downstream trailing edge 5, wherein the leading edge 4 and the trailing edge 5 are spaced axially from each other, as depicted in FIG. 1. "Leading" and "trailing" is used as a terminology in respect of the fluid flow of the main working fluid as indicated by an arrow 60.

A further element of the blade 1 is a platform 9 which is formed at an upper portion of the root portion 3 and in between the root portion 3 and the aerofoil portion 2. Thus, the aerofoil portion 2 is connected to the platform 9 and extends in the radial direction outwards from the platform 9.

The terminology of "leading" and "trailing" can also be used for the platform 9, so that the leading edge 4 of the platform 9 is the region which connects to the leading edge 4 of the aerofoil 2. The platform 9 can also be distinguished between pressure side platform and a suction side platform corresponding to the pressure side 6 of the aerofoil and the suction side 7 of the aerofoil 2.

According to FIG. 1, more cooling holes 8 may be present on the pressure side 6 and/or the suction side 7 of the blade 1 or further cooling holes could be located at the leading edge region 4 of the aerofoil 2. These cooling holes could be used for film cooling of the blade 1.

Also the platform 9 could be equipped with film cooling holes. According to the figure, a first set of film cooling holes at the pressure side platform is shown in the figure with reference to the reference numeral 51. A second set of film cooling holes at a leading edge region on the pressure side platform is indicted by reference numeral 52.

In accordance with the invention, the blade 1 also shows via broken lines the platform cooling device 10 disposed underneath the platform 9. The broken lines show the location at which platform cooling device 10 will be connected to the blade 1. This platform cooling device 10 will be described in the following in more detail.

Figure 2:
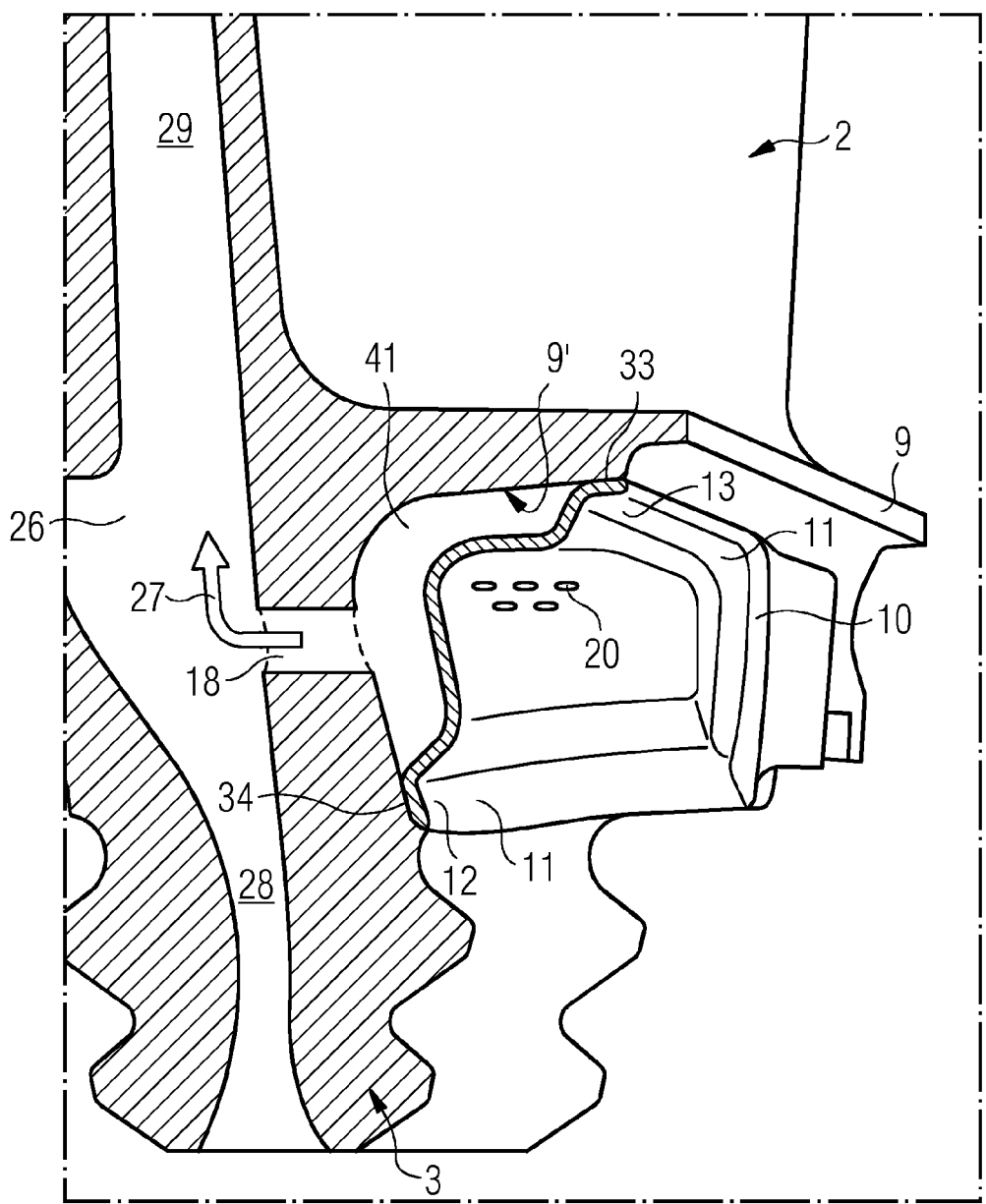
FIG. 2 shows a cut through such a blade and an inventive platform cooling device.

The following explanation will be explained in conjunction with the FIGS. 2 to 5. FIG. 2 shows a sectional view of such a blade 1 equipped with a platform cooling device 10, wherein the cut for the sectional view is indicated in FIG. 2 by the line with the references A-A. A peripheral or circumferential edge 11 is part of the platform cooling device 10 and is configured to be in contact with the platform 9 of the blade 1, as shown in FIG. 2. The circumferential edge 11 defines the farmost border of the platform cooling device 10. It encircles or surrounds the platform cooling device 10.

The contact points or contact ranges to the platform 9 is indicated in FIG. 2 as first edge section 33, which defines a connection to the platform 9, and by a second edge section 34, which defines a connection to the root portion 3 of the blade 1. The circumferential edge 11 is in continuous contact with the underside of the blade 1 and does not show any gaps.

Figure 3:
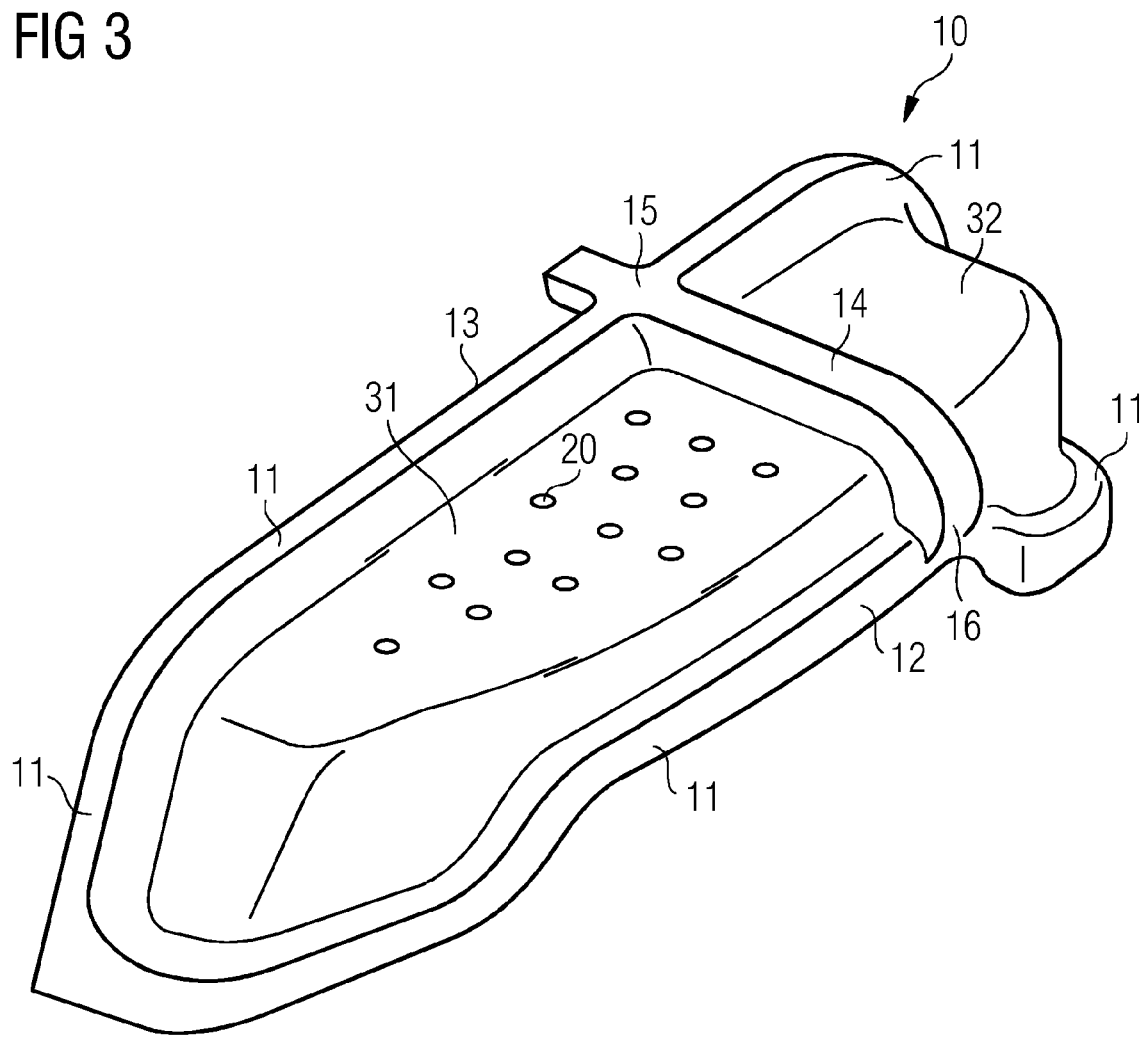
FIG. 3 shows the inventive platform cooling device in one embodiment.
Figure 5:
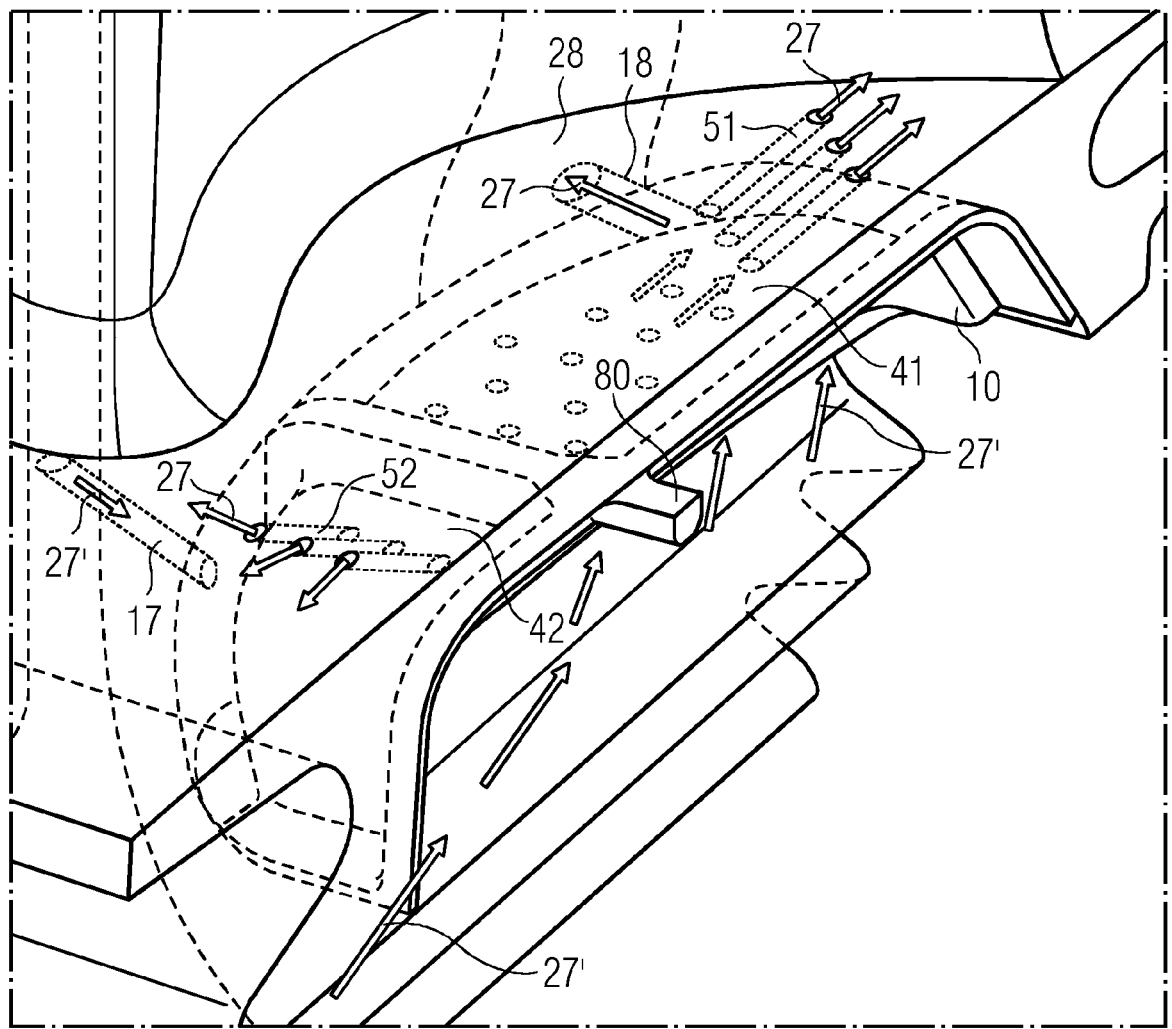
FIG. 5 shows a semi-see-through figure of a configuration of a blade with a connected platform cooling device.

Further parts of the platform cooling device 10 are distant to the surfaces of the blade 1. These sections are particularly the first surface portion 31 and the second surface portion 32 as shown in FIG. 3. The first surface portion 31 is configured to form the first cavity 41, as indicated in FIG. 5, between the platform cooling device 10 and the platform 9. The second surface portion 32 is configured to form a second cavity 42 between the platform cooling device 10 and the platform 9. The first cavity 41 and the second cavity 42 are specifically separated by a barrier 14 which is highlighted in FIG. 3. The barrier 14 is also configured, like the circumferential edge 11, to be in contact with the platform 9. The barrier 14 connects or interlinks two sections 15, 16 of the edge 11, i.e. the barrier 14 is a wall arranged between section 15 and section 16. This connection—i.e. the shape of the barrier 14—may be straight or curved. In an embodiment of the invention the barrier 14 is free of connecting holes between the first cavity 41 and the second cavity 42.

According to the invention, the two cavities 41, 42 are provided with different cooling functionality. The first surface portion 31 comprises a plurality of impingement holes 20 configured to impinge onto the platform 9 during operation of the gas turbine engine. The second surface portion 32, as depicted in FIG. 3, has specifically no impingement holes at all on its surface. Alternatively, but not shown in the figures, impingement holes may be present on the second surface portion 32 but with a different number of holes and/or different diameters size of the holes in comparison to the first surface portion 31.

A first segment 12 of the edge 11 is configured to connect with the root portion 3 of the blade, as shown in FIG. 2. Alternatively, you could also say that the first segment 12 is connected to a neck section of the blade 1 if you consider that underneath platform 9 a neck section is present before the root section 3 starts. Furthermore, a second segment 13 of the edge 11 is configured to connect with a rear surface 9' of the platform 9. "Rear" in this respect means the back surface of the platform 9. In other words, rear means a direction radially inwards in the direction of the root of the blade.

The barrier 14, as shown in FIG. 3, may be a straight wall and may be substantially perpendicular to the first segment 12 and perpendicular to the second segment 13 of the circumferential edge 11. Particularly, the barrier 14 interconnects a first section 15 of the edge 11 and a second section 16 of the edge 11, wherein the first section 15 is part of the second segment 13 and the second section 16 is part of the first segment 12 of the edge 11.

The barrier 14 may also have a different shape. Further the barrier 14 may have a different angle in respect of the edge 11 than shown in the figure. The main function of the barrier 14 is to separate two cavities from another. Depending on the temperature distribution on the platform, it may be advantageous to have a barrier angled in a degree between 45 and 90 degrees in comparison to the edge 11. The barrier may also be curved to adapt to local temperature profiles.

Figure 4:
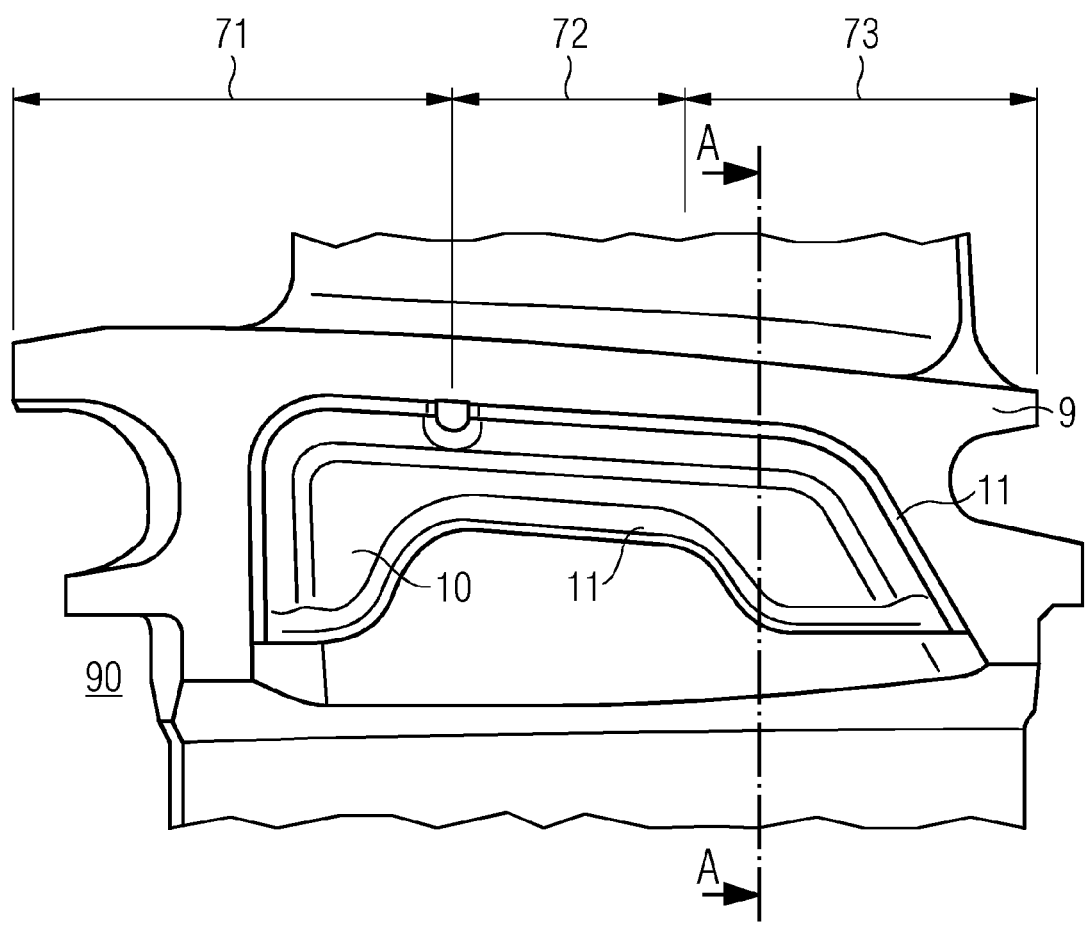
FIG. 4 shows the same embodiment from a different angle when attached to the blade.

The platform cooling device 10 will be placed in a cavity underneath the platform 9 as specifically shown in FIGS. 1, 4, and 5. The connection is advantageously fixed, for example by brazing, so that the two components are fixedly connected to another.

The previously mentioned first cavity 41 and second cavity 42 are specifically shown in FIG. 5, which shows a see-through picture of the blade 1 including the platform cooling device 10. With reference to FIG. 5 and FIG. 4, the first cavity 41 extends via a central region or section 72 and a trailing edge 73 of the platform 9. The second cavity 42 is extending in the leading edge region 71 of the platform 9. Therefore, these two cavities can be adapted to fulfill the cooling needs along the platform length.

The first cavity 41 and the second cavity 42 are in fluid connection with further passages and cavities within the blade and/or surrounding components. A cooling fluid supply passage 17 may be present in the blade 1 to provide cooling fluid to the second cavity 42. This cooling fluid supply passage 17 may provide a connection from an aerofoil supply passage 28 (shown in FIG. 2) and the second cavity 42. Furthermore, according to FIG. 5, the provided cooling fluid to the second cavity 42 is exhausted via second film cooling holes 52 (which have been indicated in FIG. 1 and FIG. 5). These film cooling holes 52 correspond to an at least one second passage piercing the platform 9 to exhaust the cooling fluid from the second cavity 42. The second film cooling holes 52 are specifically located at the leading edge portion 4' of the platform 9.

The first cavity 41 may be supplied by cooling fluid via the impingement holes 20 in the first surface region 31. The cooling fluid for the impingement holes 20 is provided from a disc cavity (highlighted as 90 in FIG. 4) and a cavity between two adjacent rotor blades as indicated by reference numeral 27' in FIG. 5. Some of the cooling air collected in the first cavity 41 will be exhausted via first film cooling holes 51 as the at least one first passage. The first film cooling holes 51 are depicted in FIG. 1 and FIG. 5 and exhaust the cooling air specifically into trailing edge section of the platform 9. A further cooling fluid release passage 18 may be present, as shown in FIG. 2 and FIG. 5, to release cooling fluid from the first cavity 41 into an aerofoil supply passage 28 for cooling fluid which is supposed to be provided to an aerofoil cooling system 29. The aerofoil supply passage 28, as shown in FIG. 2 typically connects two cooling fluid core channels as part of the hollow blade core and is part of the aerofoil cooling system. The cooling fluid flow in parts is shown by arrows in FIGS. 2 and 5 with the reference numerals 27 and 27'.

The inventive platform cooling device 10 provides a screen for the underneath side of the blade 1 to provide specific cooling functionality to the blade platform. The platform cooling device 10 comprises an impingement hole section at the first cavity 41 and a different section without impinging at the second cavity 42. Therefore, specific cooling requirements can be met along the length of the platform 9.

The invention specifically is advantageous as the cooling of the pressure side platform of a blade can be improved. Furthermore, as the platform cooling device 10 is a piece that can be equipped with different cooling functions, different engines experiencing different temperature profiles can be equipped with different and specifically adjusted platform cooling devices 10. The platform cooling device 10 can also be used just for testing different cooling functions before providing them in a final blade design. Besides, as the blade cooling device 10 and the blade 1 are separate components, they are easy to manufacture and more complex cooling structures can be enclosed in the combined component.

As a further benefit, the blade 1 and the platform cooling device 10 can be manufactured by using different technologies. For example, the platform cooling device 10 could be manufactured by laser sintering. Furthermore, different material could be used for the blade 1 and the platform cooling device 10. Therefore, the overall costs could be reduced for the blade and also materials could be used that withstand higher temperatures.

The platform cooling device 10 could be brazed or fastened in another way to the blade 1. Additionally, the laser sintering could be performed directly onto the blade 1 so that the two components connect to a single entity.

The platform cooling device 10 may also have an extension 80, as shown in FIG. 5, which may be an outwards extension of the barrier 14 to allow easier manufacturing and assembly of the two components, i.e. the blade and the platform cooling device.

The invention is particularly advantageous as thermal damages could be reduced even though higher temperatures could be used during operation of the gas turbine engine. Particularly, the pressure side platform could be cooled in a highly controlled way.

Furthermore, the invention is advantageous as the platform cooling device 10 can be equipped even for existing blades that do not have this feature available yet.

The invention claimed is:
1. A turbomachine arrangement, comprising:
a blade of a turbomachine; and
a platform cooling device for the blade configured to be positioned at a platform of the blade, the platform cooling device comprising:
a peripheral edge configured to be in contact with the platform; and
a first surface portion configured to form a first cavity between the platform cooling device and the platform, the first surface portion comprising a plurality of impingement holes configured to impinge onto the platform during operation of the turbomachine; and
a second surface portion configured to form a second cavity between the platform cooling device and the platform; and
a barrier configured to be in contact with the platform, the barrier forming a connection between two sections of the edge and separating the first cavity from the second cavity fluidically;
wherein the platform cooling device and the blade are separately manufactured components, and
wherein the platform cooling device is connected at the edge to the blade, such that the first cavity and the second cavity are formed between the platform cooling device and the blade, and
wherein the blade comprises a cooling fluid supply passage, connecting a hollow blade core and the second cavity, for supplying of cooling fluid to the second cavity during operation, and
wherein the first cavity is supplied, during operation, with cooling fluid via the impingement holes of the first surface portion.
2. The turbomachine arrangement according to claim 1, wherein the second surface portion (a) is free of impingement holes, or (b) comprises a plurality of further impingement holes with a different pattern and/or different hole diameters than the impingement holes of the first surface portion.
3. The turbomachine arrangement according to claim 1, wherein a first segment of the edge is configured to connect with a root or neck section of the blade and a second segment of the edge is configured to connect with a rear surface of the platform.
4. The turbomachine arrangement according to claim 3, wherein the barrier is a straight wall and substantially perpendicular to the first segment and/or the second segment of the edge.

5. The turbomachine arrangement according to claim 1,
wherein the platform cooling device is connected to the blade either
(i) fixedly via brazing, welding, laser welding, or boding, or
(ii) loosely by fitting the platform cooling device to a corresponding recess of the blade in which the platform cooling device is held in place by centrifugal force during operation.

6. The turbomachine arrangement according to claim 1,
wherein the platform comprises at least one first passage through the platform for releasing cooling fluid from the first cavity and/or,
wherein the platform comprises at least one second passage through the platform for releasing cooling fluid from the second cavity.

7. The turbomachine arrangement according to claim 6,
wherein the at least one first passage and/or the at least one second passage are configured as film cooling holes to film cool the platform during operation.

8. The turbomachine arrangement according to claim 1,
wherein the blade comprises
an aerofoil;
an aerofoil cooling system within the aerofoil;
at least one aerofoil supply passage through the blade for supplying the aerofoil cooling system with cooling fluid; and
a cooling fluid release passage for releasing of cooling fluid from the first cavity into the aerofoil supply passage.

9. The turbomachine arrangement according to claim 1,
wherein the platform cooling device is connected to the blade at a pressure side of the blade.

10. The turbomachine arrangement according to claim 1,
wherein the platform cooling device is built from a different material than the blade.

11. The turbomachine arrangement according to claim 1,
wherein the first cavity is positioned, in respect of a fluid flow of a working medium during operation, adjacent to a central section and/or trailing edge section of the platform, and
wherein the second cavity is positioned adjacent to a leading edge section.

12. A turbomachine sub section comprising:
a rotary disc with a plurality of blades connected to the disc, each of the blades connected with the platform cooling device according to claim 1;
an annular stator section upstream of the rotary disc and upstream of the blades in respect of a fluid flow of a working medium during operation;
a disc cavity defined between the rotary disc and the stator section, underneath leading edges of a plurality of the platforms of the blades;
wherein during operation, cooling fluid is supplied from the disc cavity, via the impingement holes of the first surface portion, to the first cavity.

13. The turbomachine sub section of claim 12,
wherein the annular stator section comprises a plurality of vanes.

* * * * *